United States Patent [19]

Mirtich et al.

[11] 4,199,650

[45] Apr. 22, 1980

[54] MODIFICATION OF THE ELECTRICAL AND OPTICAL PROPERTIES OF POLYMERS

[75] Inventors: Michael J. Mirtich, N. Olmsted; James S. Sovey, Strongsville, both of Ohio

[73] Assignee: The United States of America as represented by the Administrator of the National Aeronautics and Space Administration, Washington, D.C.

[21] Appl. No.: 958,575

[22] Filed: Nov. 7, 1978

[51] Int. Cl.$^2$ .............................................. B05D 3/06
[52] U.S. Cl. .................................... 428/421; 427/38; 427/40; 427/164; 428/474
[58] Field of Search ............... 427/38, 39, 40, 307, 427/163, 164; 428/421, 474

[56] References Cited

U.S. PATENT DOCUMENTS

| | | | |
|---|---|---|---|
| 3,069,286 | 12/1962 | Hall | 427/40 |
| 3,288,638 | 11/1966 | Van Paassen et al. | 427/40 |
| 3,528,387 | 9/1970 | Hamilton | 118/49.1 |

*Primary Examiner*—John H. Newsome
*Attorney, Agent, or Firm*—N. T. Musial; J. R. Manning; G. E. Shook

[57] ABSTRACT

An electron bombardment argon ion source is used to treat polyimide and fluorinated ethylene propylene polymers to form textured surfaces thereon. This improves the optical and electrical properties so that these polymers can be used in industrial and space applications.

10 Claims, No Drawings

MODIFICATION OF THE ELECTRICAL AND OPTICAL PROPERTIES OF POLYMERS

ORIGIN OF THE INVENTION

The invention described herein was made by employees of the U.S. Government and may be manufactured or used by or for the Government without the payment of any royalties thereon or therefor.

BACKGROUND OF THE INVENTION

A polyimide, known as Kapton, and a fluorinated ethylene propylene, known as Teflon-FEP, are two polymers that transmit visible radiation when used as thin sheets. These materials are presently used in both ground and space applications.

The use of these materials in space as thermal control surfaces, encapsulants for solar cells, reflectors for concentrator arrays, and solar sail material introduces the problem of spacecraft charging. Electrical charge buildup on external spacecraft insulating surfaces can be dissipated by the use of thin conducting films on the insulator. The application of these films can be costly. The films alter the optical properties of the materials, add weight, and create new problems, such as stability of the coating's optical properties when exposed to space environments.

Kapton coated on one side with 0.1 $\mu$m of aluminum has been proposed for solar sail, solar concentrators and reflectors in space. However, untextured Kapton has a sheet resistance of $10^{18}$ ohms/square. This is an unsatisfactorily high value when used in a space application where charging phenomena may be present.

A 100 Å thick coating of chrome has been deposited on the Kapton surface in an attempt to solve this problem. The chrome coating lowers the sheet resistance to less than $10^5$ ohms/square, and it provides a thermal emittance of 0.40 so that the material can operate up to 0.3 A.U.(10 suns). However, the coating process is expensive, and the coating adds an undesirable weight penalty to the material. Also, problems arise because the chrome does not adhere well to the smooth Kapton surface.

Surfaces of materials have been bombarded in the past by ions of various materials. By way of example, Cohen et al U.S. Pat. No. 3,699,334 describes an apparatus which provides for polishing a refractory dielectric material using an argon ion beam. U.S. Pat. No. 3,900,636 to Curry et al discloses the use of ion bombardment to improve the cutting edge of a razor blade and to improve adhesion properties. U.S. Pat. No. 3,959,303 to Feneberg et al describes a method of treatment of a silicone elastomer using an ion beam to destroy selected layers. Marchand et al U.S. Pat. No. 4,115,303 is directed to a method of making semipermeable membranes from a polymer using radiation, such as an ion beam.

SUMMARY OF THE INVENTION

Argon ions in a beam having an energy between 500 and 1000 eV and an ion beam current density between 0.1 and 1.0 mA/cm² impinge on the surface of a polymer. The resulting surface roughening or texturing is in the form of needles or spires whose vertical dimensions may range from tenths to hundreds of microns depending on the selection of beam energy, ion current density, and etch time.

OBJECTS OF THE INVENTION

It is therefore an object of the present invention to utilize an electron bombardment ion source at low power levels to treat the surface of a polymer to modify the surface chemistry and morphology without causing thermal changes in the physical properties.

Another object of the invention is to increase the surface conductivities of polyimide and fluorinated ethylene propylene polymers.

A further object of the invention is to provide polymers having improved or unique optical properties for use in a space environment, as a solar sail or a thermal blanket.

Still another object of the invention is to enhance thin film adherence to a polymer by providing a textured surface thereon by ion bombardment.

These and other objects of the invention will be apparent from the specification which follows and from the claims.

DETAILED DESCRIPTION OF THE INVENTION

In order to illustrate the beneficial technical effects of the invention, samples of three polymers were treated in accordance with the invention with argon ions from an electron bombardment ion source. Each sample was 8×8 cm.

The first polymer was a polyimide known as Kapton. This sample had a thickness of 8 $\mu$m.

The second polymer was aluminized Kapton having a 127 $\mu$m thickness. The Kapton was coated on one side with 0.1 $\mu$m aluminum to obtain a high solar reflectivity.

The third polymer was a silvered fluorinated ethylene propylene polymer known as Teflon-FEP. This polymer also was 127 $\mu$m thick and was coated with 0.15 $\mu$m of silver. This FEP was backed with two layers of polyimide tape.

These polymer samples were exposed to 0.5 keV to 1.0 keV Argon ions at ion current densities of 0.5 mA/cm² to 1.0 mA/cm² for various exposure times. The Argon ion beam was from an electron bombardment ion source of the type developed from electric propulsion technology. Such an ion source is described in "Advances in Electronics and Electron Physics" by H. R. Kaufman, Vol. 36, pages 365-373. Beam extraction was accomplished by a dished, two grid ion optics system. Such a system is described in AIAA Paper No. 76-1017 entitled "A 30 cm Diameter Argon Ion Source." Neutralization of the ion beam was achieved by secondary electrons released by ion bombardment of the vacuum facility walls.

This electron bombardment ion source was located in a vacuum facility which was sufficiently large to minimize back sputtered facility material from contaminating the experiments. The vacuum facility was maintained at a pressure of $4 \times 10^{-5}$ torr during the operation of the ion source.

The samples to be treated were positioned normal to the ion beam at a location 20 centimeters from the ion source. The current density at this location was 1.0 mA/cm² for polyimide samples and 0.5 mA/cm² for FEP samples. The beam was uniform over the sample. Beam exposure times varied in duration from 10 to 115 minutes.

Optical properties and electrical resistances of the samples were measured before and after surface treatment. Spectral transmittance and reflectance measurements were made between 0.33 and 2.16 μm using an integrating sphere described in NASA TMX-52687. Values of the spectral reflectance of the opaque materials in the infrared region (1-15.5) μm were obtained using a heated blackbody (hohlraum) reflectometer. This procedure is described in NASA TND-3187.

The sheet resistance of the polymer samples were measured by placing them in a holder between two strips of indium. Using the dimensions of the sample, values of sheet resistance expressed in ohms per square were obtained. The surface resistivity is used to determine changes in the electrical conductivity of the polymer samples.

Spectral optical data, sheet resistivity measurements, and calculated absorptance and emittance measurements for the polymer samples are set forth in the Table. A beam energy of 1 keV and a current density of 1.0 mA/cm$^2$ is adequate to treat the surface of the polyimide samples. This beam intentsity is sufficient to texture the polyimide surface in a reasonable time, and the beam power density is low enough to insure the polyimide material maintains its physical integrity.

The surfaces of the polyimide samples were examined using a scanning electron microscope after each had been ion beam textured for 10, 30, and 115 minutes. It was found that increasing the exposure time causes changes in the surface morphology. At 115 minutes spires 5 μm high appeared in the surface.

It was found that texturing the polyimide with 1 keV argon ions at a current density of 1.0 mA/cm$^2$ for only 10 minutes caused a large decrease in spectral transmittance at all wavelengths. The largest reductions took place below 1.0 μm. Increasing the exposure time up to 60 minutes continues to decrease the transmittance at all wavelengths. The 115-minute exposure caused the already thin polyimide to become thinner, as an increase in the spectral transmittance was observed. Complete penetration of the polyimide occurred after ion etching for a period of approximately 180 minutes.

As shown in the Table, the minimum sheet resistance and the lowest value of total transmittance occurred when the polyimide was exposed to the beam for 60 minutes. A sheet resistance of 10,000 ohms per square, desirable for space applications, was obtained after a 30-minute ion beam exposure. The decrease in sheet resistance from greater than 10$^7$ to 10,000 ohms per square is believed due to a chemical change in the surface structure of the polyimide inasmuch as other measurements rule out any contamination effects of the tank walls or ion source. It is further believed that because of the chemical nature of the polyimide molecules which exhibit strong intermolecular and weak intramolecular bonding, ion beam texturing of the surface may release some carbon atoms. This causes a conductivity.

The reduction in total transmittance due to beam exposure time was accompanied by an increase in solar absorptance with very little changes in the initially small reflectance. The 115-minute ion beam exposure time caused a reversal in the trend of all the measured parameters. This indicated the exposure was excessive for a polyimide having this thickness. The significant increase in sheet resistance at the 115-minute exposure is believed to be due to the very rough surface structure or partial sputter through in the valleys of the microstructure. No attempt was made to measure the infrared reflectance using the hohlraum reflectometer for the transparent polyimide.

The aluminized polyimide is representative of a solar reflector or a solar sail. This material is likewise exposed on the polyimide side to 1 keV, 1.0 mA/cm$^2$ argon beam ions. A scanning electron photomicrograph of the surface of this material after 10 minutes of texturing by the ion beam shows the surface morphology to be the same as for the surface of the first sample after a 10-minute exposure under similar conditions.

The spectral reflectance between 0.33 and 15.5 μm of the aluminized polyimide surface of the second sample shows that 10 minutes of texturing is enough time to cause large reductions in the spectral reflectance below 2 μm. Increasing the exposure time to 31 minutes yields further, but smaller reductions.

Use of aluminized polyimide as a solar sail or solar reflector in space missions at 0.3 A.U. (10 suns) requires a thermal emittance of at least 0.40 to keep the aluminized polyimide at safe temperature level, about 550° K. By ion beam texturing the Kapton surface for 30 more minutes, a thermal emittance of 0.765 was attained at this temperature. Using 550° K. as a safe upper limit operating temperature for the aluminized polyimide, then with an emittance of 0.765 on the textured polyimide side the material could tolerate operation at 0.20 A.U. (25 suns). An additional benefit of using textured material is a surface restivity of 6000 ohms per square.

The silvered FEP was exposed on the FEP side to the argon ion beam. This coated FEP represents a thermal control surface for spacecraft and has proper optical properties, but it does not have a surface conductivity necessary to reduce the effects of spacecraft charging. Attempts to texture FEP at the same energy level and beam current density as the polyimide of the first two samples caused thermal decomposition of the FEP. A reduced beam current density of 0.5 mA/cm$^2$ and a beam energy of 0.5 keV was found to be more appropriate to ion beam texturing FEP with argon ions.

Sheet resistance measurements indicated that ion beam texturing the FEP surface did not decrease the surface resistivity. This is shown in the Table. A comparison of the spectral reflectance of untextured and textured FEP shows that at wavelengths below 4 μm there is a small reduction in spectral reflectance. No significant trend takes place at wavelengths greater than 4 μm.

The solar absorptance changed from 0.087 to 0.122 as shown in the Table. The thermal emittance calculated at 300° K. which is the normal operating temperature of this thermal control coating on a spacecraft, changed from 0.807 to 0.670. This leads to a higher $\alpha/\epsilon$ ratio, thus increasing the surface temperature. Although the ion beam texturing of FEP does not lower the ratio of $\alpha/\epsilon$ or produce a conducting surface, the surface treatment provides for better adherence of metallic films.

ALTERNATE EMBODIMENT

Metallizing the textured FEP surface with gold produces a relatively efficient solar absorber. An FEP sample substantially the same as the third sample shown in the Table, was coated with gold. This sample is shown in the Table as FEP (metalized).

It is contemplated this metalized FEP material is applicable to heating and cooling systems in terrestrial applications. By way of example, this FEP polymer can be ion beams textured and metalized with aluminum to produce a solar selective surface. The FEP polymer can be ion machined at rates up to 200 μm/hr, and ion beam processing may be cost effective relative to electroplated systems.

The easily textured FEP surfaces appear matt white. Subsequent sputter deposition of the gold film results in a microscopically rough metal film having grey-black matt appearance.

While several embodiments of the invention have been described, it is contemplated that various modifications may be made without departing from the spirit of the invention or the scope of the subjoined claims.

| POLYMER | Texture Exposure time, min | Total solar transmittance, $\tau s$ | Total solar reflectance, $\rho s$ | Total solar adsorptance, $\alpha$ | Total infrared reflectance, $\rho$ | Thermal emittance, T | Sheet resistance of polymer surface, ohm/sq. |
|---|---|---|---|---|---|---|---|
|  | Untextured | 0.724 | 0.102 | 0.174 |  |  | $\left(\begin{array}{c}>10^7\\ {}^a10^{18}\end{array}\right)$ |
| POLYIMIDE | 10 | .324 | .016 | .660 |  |  | 18 000 |
|  | 30 | .224 | .006 | .770 |  |  | 10 000 |
|  | 60 | .193 | .017 | .790 |  |  | 6 000 |
|  | 115 | .217 | .003 | .780 |  |  | 21 000 |
|  |  |  |  |  | At 550 K | At 550 K |  |
| Aluminized polyimide | Untextured | — | 0.501 | 0.499 | 0.262 | 0.738 | $\left(\begin{array}{c}>10^7\\ {}^a10^{18}\end{array}\right)$ |
|  | 10 | — | .106 | .894 | .329 | .671 | 10 000 |
|  | 31 | — | .077 | .923 | .235 | .765 | 6 000 |
|  |  |  |  |  | At 300 K | At 300 K |  |
| FEP | Untextured | — | 0.913 | 0.087 | 0.193 | 0.807 | $\left(\begin{array}{c}10^7\\ {}^a10^{16}\end{array}\right)$ |
|  | 27 | — | .878 | .122 | .330 | .670 | $>10^7$ |
| (Metalized) | 27 | — | 0.118 | 0.882 | 0.292 | 0.708 | — |

$^a$Values found in the literature.

What is claimed is:

1. A method of treating the surface of a polymer to modify the surface morphology, optical and electrical properties of the same to attain high thermal emittance and low sheet resistance comprising the steps of
    placing said polymer in a vacuum environment of about $4\times 10^{-5}$ torr,
    exposing at least one surface of the said polymer to a beam of ions having an energy between about 500 and 1000 eV and an ion beam current density between 0.1 and 1.0 mA/cm$^2$ and
    neutralizing said ion beam.
2. A method of treating the surface of a polymer to modify the optical and electrical properties of the same as claimed in claim 1 wherein the beam comprises argon ions.
3. The method of claim 2 including
    providing a source of argon ions in said vacuum environment, and
    positioning said polymer in said beam of said argon ions at a location about 20 centimeters from said source, said one surface being substantially normal to said beam.
4. The method of claim 3 wherein the polymer is positioned in the beam of argon ions between 10 and 115 minutes.
5. A method of treating the surface of a polyimide to modify the optical and electrical properties of the same as claimed in claim 4 wherein the beam of argon ions has a current density of about 1.0 mA/cm$^2$ and is uniform over said surfaces.
6. A method of treating the surface of a fluorinated ethylene propylene polymer as claimed in claim 4 wherein the beam of argon ions has a current density of about 0.5 mA/cm$^2$ and is uniform over said surfaces.
7. The method of claim 6 wherein the energy of said beam is about 500 eV.
8. The method of claim 7 wherein the fluorinated ethylene propylene is positioned in the beam for about 27 minutes.
9. The method of claim 8 including the steps of
    removing said beam from the fluorinated ethylene propylene polymer, and
    metalizing the exposed surface by sputtering a layer of metal thereon.
10. An article treated according to the process of claim 1.

* * * * *